United States Patent
Ikuta et al.

(10) Patent No.: US 7,560,193 B2
(45) Date of Patent: *Jul. 14, 2009

(54) SECONDARY BATTERY AND METHOD FOR PRODUCING THE SAME

(75) Inventors: Shigeo Ikuta, Kawanabe-gun (JP); Yusuke Fukumoto, Moriguchi (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/314,008

(22) Filed: Dec. 22, 2005

(65) Prior Publication Data

US 2006/0105245 A1   May 18, 2006

Related U.S. Application Data

(63) Continuation-in-part of application No. PCT/JP2005/004120, filed on Mar. 9, 2005.

(30) Foreign Application Priority Data

Jun. 22, 2004   (JP) .................. 2004-183949

(51) Int. Cl.
  *H01M 2/16* (2006.01)
  *H01M 10/04* (2006.01)
(52) U.S. Cl. ..................... 429/246; 429/251
(58) Field of Classification Search ........... 429/246, 429/251
  See application file for complete search history.

(56) References Cited

U.S. PATENT DOCUMENTS

| | | | |
|---|---|---|---|
| 4,363,856 A | | 12/1982 | Waterhouse |
| 5,302,368 A | | 4/1994 | Harato et al. |
| 5,342,709 A | * | 8/1994 | Yahnke et al. ............ 429/162 |
| 5,597,512 A | * | 1/1997 | Watanabe et al. ........... 516/34 |

(Continued)

FOREIGN PATENT DOCUMENTS

DE    103 04 735 A1    7/2004

(Continued)

OTHER PUBLICATIONS

Morinaga et al., "Fabrication of Fine Alpha-Alumina Powders by Thermal Decomposition of Ammonium Aluminum Carbonate Hydroxide (AACH)", 2000, Elsevier Science, Ltd., Acta Materialia 48 (2000), pp. 4735-4741.*

(Continued)

*Primary Examiner*—Gregg Cantelmo
(74) *Attorney, Agent, or Firm*—McDermott Will & Emery LLP

(57) ABSTRACT

In a secondary battery including a positive electrode, a negative electrode and a porous film bonded to the surface of at least one of the positive electrode and the negative electrode, the porous film includes ceramic particles and a binder, and the ceramic particles include polycrystalline particles obtained by mechanically crushing a fired material comprising a ceramic that is directly synthesized from a ceramic precursor. The porous film has a porosity of 40 to 80%, for example. The porous film can be formed by a method including the steps of: obtaining a fired material comprising a ceramic from a ceramic precursor; obtaining ceramic particles by mechanically crushing the fired material of the ceramic; obtaining a slurry including the ceramic particles and a binder; and applying the slurry onto the surface of an electrode, followed by drying.

12 Claims, 2 Drawing Sheets

U.S. PATENT DOCUMENTS

| | | | |
|---|---|---|---|
| 5,824,434 | A | 10/1998 | Kawakami et al. |
| 5,882,721 | A | 3/1999 | Delnick |
| 5,948,464 | A | 9/1999 | Delnick |
| 5,965,299 | A * | 10/1999 | Khan et al. .................. 429/313 |
| 6,053,953 | A | 4/2000 | Tomiyama et al. |
| 6,084,767 | A * | 7/2000 | Day et al. .................... 361/512 |
| 6,110,619 | A | 8/2000 | Zhang et al. |
| 6,235,427 | B1 | 5/2001 | Idota et al. |
| 6,287,720 | B1 * | 9/2001 | Yamashita et al. ........... 429/131 |
| 6,296,969 | B1 * | 10/2001 | Yano et al. .................. 429/145 |
| 6,638,988 | B2 | 10/2003 | Takata et al. |
| 6,886,931 | B2 | 5/2005 | Yatake |
| 2002/0055038 | A1 * | 5/2002 | Aihara et al. ................ 429/142 |
| 2002/0102456 | A1 * | 8/2002 | Aihara et al. ................ 429/144 |
| 2003/0162090 | A1 | 8/2003 | Okada et al. |
| 2003/0170536 | A1 | 9/2003 | Aihara et al. |
| 2004/0166407 | A1 | 8/2004 | Nakajima et al. |
| 2005/0214637 | A1 | 9/2005 | Imachi et al. |
| 2006/0188785 | A1 * | 8/2006 | Inoue et al. .................. 429/246 |
| 2006/0216608 | A1 | 9/2006 | Ohata et al. |
| 2007/0042270 | A1 * | 2/2007 | Ohata et al. .................. 429/246 |

FOREIGN PATENT DOCUMENTS

| | | |
|---|---|---|
| EP | 0 809 314 A2 | 11/1997 |
| JP | 07-220759 | 8/1995 |
| JP | 7-220759 | 8/1995 |
| JP | 08-236114 | 9/1996 |
| JP | 10-050287 | 2/1998 |
| JP | 10-106530 | 4/1998 |
| JP | 10-214640 | 8/1998 |
| KR | 1999-028977 | 4/1999 |
| KR | 2001-0055897 | 7/2001 |
| WO | WO 2005-011043 A1 | 2/2005 |

OTHER PUBLICATIONS

Walls et al. "Fumed silica-based composite polymer electrolytes: synthesis, rheology and electrochemistry" Journal of Power Sources 89 (2000), pp. 156-162.*

Kim et al. "Electrochemical and physical properties of composite polymer electrolyte of poly(methyl methacrylate) and poly(ethylene glycol diacylate)", Journal of Power Sources, 2003, 221-224, V. 124.

Thorsland, et al., "Characterization of Porous A1N Separators for Batteries," Mat. Res. Soc. Symp. Proc., 1996, pp. 315-321, vol. 431, Materials Research Society.

European Search Report issued in corresponding European Patent Application No. EP 1 667 254 A1.

European Search Report issued in European Patent Application No. 05709814.7-2119, dated Apr. 16, 2007.

European Search Report issued in corresponding European Patent Application No. 05720391.1-1227, dated Mar. 15, 2007.

* cited by examiner

SECONDARY BATTERY AND METHOD FOR PRODUCING THE SAME

CROSS-REFERENCE TO RELATED APPLICATION

This application is a continuation-in-part of International Application No. PCT/JP05/004120, filed Mar. 9, 2005 which in turn claims the benefit of Japanese Application No. 2004-183949, filed Jun. 22, 2004, the disclosures of which Applications are incorporated by reference herein in their entirety.

FIELD OF THE INVENTION

The present invention relates to a secondary battery having excellent discharge characteristics, and more particularly to a secondary battery in which a porous film for improving the safety of the battery is provided on its electrode plate.

BACKGROUND OF THE INVENTION

Secondary batteries such as a lithium ion secondary battery are generally provided with an electrode plate group comprising a positive electrode, a negative electrode and a separator interposed therebetween. The separator serves to provide electrical insulation between the two electrodes and also to retain an electrolyte. Recently, in order to improve the product quality, it has been proposed to apply a slurry containing fine particles and a resin binder onto the surface of the electrode plate, and to dry the coated film with hot air to form a porous film, thereby integrating the electrode plate and the porous film (see the specification of Japanese Patent No. 3371301). A separator comprising a resin made of polyolefin and inorganic fine particles has also been proposed (see Japanese Unexamined Patent Publication No. Hei 10-50287).

In the case of forming a porous film, it is common to use a slurry obtained by dispersing the source material of the porous film in a liquid component using a disperser. The source material of the porous film contains fine particles that will serve as the filler in the porous film and a resin that will serve as the binder of the fine particles. The fine particles serving as the filler are supplied in the form of powder to the disperser.

Conventionally used fine particles comprise spherical or substantially spherical primary particles, and the primary particles are aggregated by weak van der Waals force (cohesive force), forming particle agglomerates. FIG. 3 shows a schematic diagram of a particle agglomerate 32 comprising conventionally used primary particles 31.

Therefore, when preparing the slurry, particle agglomerates are separated into primary particles as much as possible using a disperser such as a bead mill so as to stabilize the thickness and porosity of the porous film (see Japanese Unexamined Patent Publication No. Hei 10-106530 (FIG. 2)).

SUMMARY OF THE INVENTION

When a porous film is formed using a slurry in which spherical or substantially spherical primary particles that are separated from each other are dispersed, and an electrode plate that has been integrated with the porous film is used, a short circuit failure or the like is difficult to occur during formation of an electrode plate group. However, since spherical or substantially spherical primary particles that have been released from the agglomerates are dispersed in the slurry, the primary particles tend to be filled into the porous film at high density. As a result, the ratio of the void volume in the porous film (the porosity) becomes low, and the high-rate charge/discharge characteristics and the charge/discharge characteristics under low temperature environments of the secondary battery therefore tend to be insufficient.

A secondary battery including a porous film in which primary particles are filled at high density may not be able to provide sufficient characteristics, for example, as the power source of a mobile phone, a notebook computer or the like. In particular, when used under a temperature environment of 0° C. or lower, the secondary battery may suffer a significant deterioration in charge/discharge characteristics, posing a practical problem.

In view of the foregoing, it is an object of the present invention to improve the large-current discharge characteristics, especially at a low temperature for a secondary battery in which a porous film for improving the safety of the battery is provided on its electrode plate.

The present invention relates to a secondary battery comprising: a positive electrode; a negative electrode; and a porous film that is bonded to the surface of at least one of the positive electrode and the negative electrode, wherein the porous film includes ceramic particles and a binder, and the ceramic particles include polycrystalline particles obtained by mechanically crushing a fired material comprising a ceramic.

It should be noted that it is preferable to use a fired material comprising a ceramic that is directly synthesized from a ceramic precursor. A fired material comprising a ceramic that is directly synthesized from a ceramic precursor refers to a fired material that is synthesized from a ceramic precursor without separately undergoing formation of primary particles.

In the case of mechanically crushing a fired material comprising a ceramic, a large number of polycrystalline particles that include a plurality of regions comprising single crystals are produced by performing crushing to an appropriate degree. Such polycrystalline particles have lumps, bumps or bulges, and have a three-dimensional structure in an indefinite form, such as a dendritic, coralloid or clustered shape. Therefore, it seems that polycrystalline particles obtained by mechanically crushing the fired material comprising a ceramic become difficult to be filled in the porous film at high density. In particular, when the polycrystalline particles have a dendritic or coralloid shape, voids tend to be formed between the particles, and a high porosity thus can be readily achieved. Accordingly, with the above-described structure, it is possible to form a porous film having a porosity that is significantly higher than that achieved with conventionally used structures.

When the bulk density of the ceramic particles is smaller, the porosity of the resulting porous film can be higher. However, when the bulk density is too small, the ceramic particles become difficult to handle in the step of preparing a slurry containing the ceramic particles and the binder. From the viewpoint of achieving both a high porosity for the porous film and ease of production of the porous film, it is preferable that the ceramic particles have a bulk density of 0.1 to 0.8 g/Cm$^3$.

It is preferable that the ceramic particles have a BET specific surface area of 3 to 20 m$^2$/g. Ceramic particles having such a BET specific surface area is suitable to be combined with a small amount of a binder to form a high-porosity porous film.

Not all of the ceramic particles need to be polycrystalline particles obtained by mechanically crushing a fired material comprising a ceramic, and, for example, not less than 70 wt % may be constituted by the polycrystalline particles, and less than 30 wt % may be constituted by other particles. It is preferable that at least a portion of the other particles comprises at least one selected from the group consisting of alumina, magnesia, silica and zirconia.

From the viewpoint of ensuring both the charge/discharge characteristics of the battery and the mechanical strength of the porous film, it is preferable that the porous film have a porosity of 40 to 80%. With a porous film having such a high porosity, the charge/discharge characteristics at large currents and the charge/discharge characteristics under low temperature environments of the battery will not be significantly impaired. However, when the porosity is too high, the mechanical strength of the porous film is weakened, so that crushing and separation of the porous film tend to occur.

Although the porous film also serves as the separator in the secondary battery of the present invention, the present invention is particularly suitable for the above-described secondary battery, further comprising a sheet-like (cloth-like) separator interposed between the positive electrode and the negative electrode. As the sheet-like separator, conventionally used sheet-like separators, including, for example, a microporous sheet made of polyolefin can be used, without any particular limitation.

While the porous film has also a function similar to that of a conventionally used sheet-like separator, its structure is greatly different from that of a conventionally used sheet-like separator. Unlike a microporous sheet or the like obtained by drawing a resin sheet, the porous film has a structure in which the ceramic particles are bonded with each other using a binder. Thus, the tensile strength of the porous film in the plane direction is lower than that of the sheet-like separator. However, the porous film is superior in that it does not, unlike the sheet-like separator, heat shrink even when exposed to high temperatures. When an internal short circuit occurs or when the battery is exposed to a high temperature, the porous film has the function of preventing the short circuit from being spread or inhibiting abnormal heating, thereby improving the safety of the secondary battery.

The present invention also relates to a method for producing a secondary battery, comprising the steps of: obtaining a fired material comprising a ceramic from a ceramic precursor; obtaining ceramic particles including polycrystalline particles by mechanically crushing the fired material comprising a ceramic; obtaining a slurry including the ceramic particles and a binder; and applying the slurry onto a surface of an electrode, followed by drying, thereby obtaining a porous film bonded onto the surface of the electrode.

With the above-described method, a porous film including ceramic particles that comprise polycrystalline particles and having a high porosity can be formed efficiently. That is, the step of obtaining ceramic particles in the above-described method is suitable for obtaining polycrystalline particles having a three-dimensional structure in an indefinite form that is difficult to be filled at high density.

It is preferable that the ceramic particles includes α-alumina. In the case of obtaining ceramic particles including α-alumina, it is preferable to use aluminum ammonium salt and/or aluminum alkoxide as the ceramic precursor. This is because using these as the precursor can give polycrystalline particles comprising high-purity α-alumina, so that an unnecessary side reaction is difficult to occur inside the battery.

By crushing a fired material having the above-described structure, the polycrystalline particles in an indefinite form are easily obtained. The thus obtained α-alumina particles, which are polycrystalline particles, are difficult to be filled at high density, and therefore give a porous film having a high porosity.

It is preferable that medialess dispersion is performed in the step of obtaining a slurry including ceramic particles and a binder. With medialess dispersion, it is possible to obtain the slurry by dispersing polycrystalline particles in a liquid component, without destroying the three-dimensional structure in an indefinite form, such as a dendritic shape. That is, with medialess dispersion, it is possible to obtain the slurry without impairing the property of ceramic particles of being difficult to be filled at high density.

With the present invention, it is possible to improve the large-current discharge characteristics, especially at a low temperature for a secondary battery in which a porous film for improving the safety of the battery is bonded to its electrode plate. Moreover, with the present invention, it is possible to produce such a secondary battery at low cost.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The secondary battery of the present invention comprises: a positive electrode; a negative electrode; and a porous film that is bonded to the surface of at least one electrode selected from the positive electrode and the negative electrode. While the present invention is preferably applied to a lithium ion secondary battery, it can be applied to various other secondary batteries, including, for example an alkaline storage battery.

The present invention encompasses all the cases where the porous film is disposed so as to be interposed between the positive electrode and the negative electrode. In other words, the present invention encompasses the cases where the porous film is bonded to the surface of the positive electrode only, where it is bonded to the surface of the negative electrode only, and where it is bonded to both the surface of the positive electrode and the surface of the negative electrode. Further, the present invention encompasses the cases where the porous film is bonded to only one surface of the positive electrode, where it is bonded to both surfaces of the positive electrode, where it is bonded to only one surface of the negative electrode, and where it is bonded to both surfaces of the negative electrode.

The porous film includes ceramic particles and a binder. Even when the secondary battery includes a sheet-like separator, the porous film needs to be bonded to the surface of at least one of the positive electrode and the negative electrode. The reason is that a sheet-like separator generally has low heat resistance. Even when the porous film is bonded onto a sheet-like separator, the porous film will shrink with the sheet-like separator if heat is generated as a result of an internal short circuit.

It is also not practical to form a sheet composed only of the porous film and to interpose this between the positive electrode and the negative electrode. This is because, in the case of forming a sheet composed only of the porous film, the thickness of the sheet needs to be made considerably large, from the viewpoint of maintaining the strength of the sheet. Moreover, a large amount of a binder will be required. Using such a porous film makes it difficult to maintain the battery characteristics and the design capacity.

Figure 1:
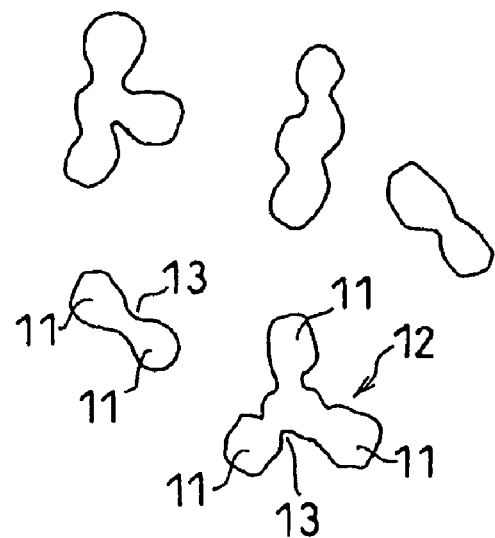
FIG. 1 is a schematic diagram of polycrystalline particles.

The polycrystalline particles according to the present invention includes single crystals that have grown to a size comparable to that of conventionally used primary particles (e.g., an average particle size of 0.05 µm to 1 µm). FIG. 1 shows a schematic diagram of polycrystalline particles 12. Regions 11 including single crystals are shown as being connected. The polycrystalline particles 12 have junctions where the single crystal cores are bonded to each other, and are greatly different in this respect from a conventionally used filler having no such junctions and in which primary particles are aggregated by van der Waals force. Since the grown single crystal cores are connected, the polycrystalline particles are not spherical, but usually have lumps, bumps or bulges, and preferably show a dendritic, coralloid or clustered shape. Although it is preferable that, as shown in FIG. 1, so-called necks 13 are formed at the junctions, it is also possible to use particles where necks cannot be clearly identified.

Ceramic particles including the polycrystalline particles as described above can be readily obtained, for example, by mechanically crushing a fired material comprising a ceramic to an appropriate degree. In addition, although it is preferable that the ceramic particles are entirely comprised of the polycrystalline particles, it may include other particles, including, for example, spherical or substantially spherical primary particles or particle agglomerates thereof, if they are less than 30 wt % of the ceramic particles, for example. As other particles, it is preferable to use particles of alumina, magnesia, silica and zirconia, for example. These may be used alone or in combination of two or more of them.

The polycrystalline particles include preferably not less than 3, more preferably not less than 5 and not more than 30 single crystal cores, on average. For example, the number of single crystal cores included in a single polycrystalline particle is determined for 5 polycrystalline particles from scanning electron microscope (SEM) pictures or the like, and the average of these is preferably not less than 3, more preferably not less than 5 and not more than 30.

The bulk density of the ceramic particles is preferably 0.1 to 0.8 g/cm$^3$, more preferably 0.3 to 0.6 g/cm$^3$. When the bulk density is less than 0.1 g/Cm$^3$, the amount of the binder becomes relatively small with respect to the specific surface area of the ceramic particles, although the porosity of the porous film improves. On the other hand, when the bulk density is greater than 0.8 g/cm$^3$, the amount of the binder becomes relatively large, so that the porosity of the porous film may not sufficiently improve. It should be noted that the bulk density of the ceramic particles is measured by a static method. The static method is carried out in accordance with JIS R9301-2-3 (1999), for example.

The BET specific surface area of the ceramic particles is preferably 3 to 20 m$^2$/g. In the case of obtaining the ceramic particles by mechanically crushing a fired material comprising a ceramic, the BET specific surface area increases as crushing proceeds. When crushing of the fired material does not proceed sufficiently and the BET specific surface area becomes less than 3 m$^2$/g, the porosity of the porous film may not sufficiently improve. Conversely, when the BET specific surface area exceeds 20 m$^2$/g, the specific surface area of the ceramic particles becomes too large relative to the amount of the binder, which may result in production problems, for example, that the slurry is gelled when the particles are dispersed in a liquid component, or that the particles have a stronger tendency to aggregate.

The porosity of the porous film is preferably 40 to 80%, more preferably 45 to 80%, particularly preferably 50 to 70%. When the porous film has a high porosity of not less than 40%, in particular, not less than 45%, the charge/discharge characteristics at large currents and the charge/discharge characteristics under low temperature environments of the battery will not be impaired significantly. However, when the porosity exceeds 80%, the mechanical strength of the porous film is reduced.

Figure 3:
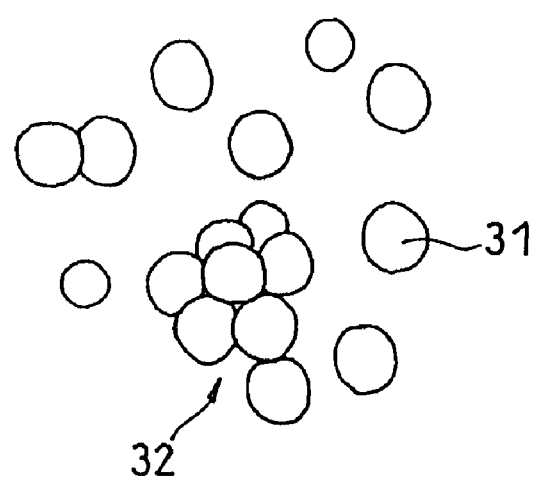
FIG. 3 is a schematic diagram of a particle agglomerate comprising conventionally used primary particles.

When a slurry in which spherical or substantially spherical primary particles that are separated from each other are dispersed is prepared using a filler that includes a particle agglomerate 32 as shown in FIG. 3, and a porous film is formed using this, the porosity of the porous film has a low value of less than 40%. In this case, it is difficult to achieve a porosity of not less than 40%. Furthermore, when such a porous film is bonded to an electrode plate, the discharge characteristics will not reach a satisfactory level at 0° C. and 2 C rate for a lithium ion secondary battery, for example.

On the other hand, when a filler including polycrystalline particles 12 as shown in FIG. 1 is used, it is possible to readily achieve a porosity of not less than 40%, or even not less than 45%.

The porosity of the porous film may be measured, for example, in the following manner.

First, a slurry in which the source material of the porous film is dispersed is prepared. That is, ceramic particles and a binder are mixed with a liquid component, and medialess dispersion is performed to prepare a slurry. The resulting slurry is passed through a suitable filter, and applied in a predetermined thickness onto a metal foil with a doctor blade. Subsequently, the coated film is dried, completing a test piece of the porous film. Using this, the porosity of the test piece is calculated by the following procedure.

In the case of calculating the porosity, a true volume V1, which include no voids, and an apparent volume V2, which include voids, are measured first for the test piece of the porous film. The true volume V1 can be determined by calculation from the weight of the test piece of the porous film, the true density of the ceramic particles, the true density of the binder and the mixing ratio of the ceramic particles and the binder. In addition, the apparent volume V2 can be determined from the outer dimensions (thickness and area) of the test piece of the porous film. A porosiry P can be determined using the following expression:

$$P(\%)=\{(V2-V1)/V2\}\times 100$$

There is no particular limitation with respect to the material (the type of ceramics) for the polycrystalline particles, but an oxide, a nitride, a carbide and the like can be used alone or in combination of a plurality of them. Among them, an oxide is preferable because, for example, it is readily available. As the oxide, it is possible to use alumina (aluminum oxide), titania (titanium oxide), zirconia (zirconium oxide), magnesia (magnesium oxide), zinc oxide, silica (silicon oxide) and the like. Among them, alumina is preferable, and α-alumina is particularly preferable.

α-alumina is chemically stable, and those of high purity are particularly stable. Moreover, it will not be affected by the electrolyte or the redox potential inside the battery, and will not cause a side reaction that would adversely affect the battery characteristics.

The ceramic particles according to the present invention can be readily obtained, for example, by a method including the step of firing a ceramic precursor to obtain a fired material comprising a ceramic, and the step of mechanically crushing the fired material of the ceramic. The fired material comprising a ceramic has a structure in which grown single crystal cores are connected in a three-dimensional form. By mechanically crushing such a fired material to an appropriate degree, it is possible to obtain ceramic particles that include polycrystalline particles having a shape difficult to be filled at high density.

In the case of obtaining ceramic particles including high-purity α-alumina, it is preferable to use aluminum ammonium salt and/or aluminum alkoxide as the ceramic precursor or the source material thereof. For example, aluminum tributoxide and the like can be used as aluminum alkoxide. For example, ammonium dawsonite, ammonium alum and the like can be used as aluminum ammonium salt. Although aluminum ammonium salt and/or aluminum alkoxide can be fired as they are, aluminum alkoxide is usually fired after undergoing a process such as hydrolysis. It is preferable that aluminum ammonium salt is directly fired, after undergoing dehydration or drying. For example, the ceramic particles can be obtained by reacting an aluminum salt such as aluminum sulfate with $NH_4HCO_3$ to synthesize ammonium dawsonite, and dehydrating it, followed by firing to grow the particles.

Since aluminum ammonium salt or aluminum alkoxide has high purity, it is rarely the case that the crystal growth of alumina is hindered by impurities when firing them; accordingly, a fired material comprising α-alumina in which single crystal cores have very uniform particle sizes tend to be formed.

When mechanically crushing the fired material, it is preferable to use a dry grinding means such as a jet mill. By controlling the crushing conditions, it is possible to obtain ceramic particles having a desired bulk density, BET specific surface area or average particle size.

By preparing a slurry including the obtained ceramic particles and a binder, applying this onto the surface of an electrode, followed by drying, it is possible to obtain a porous film having a high porosity of 40% to 50% or more and being bonded to the surface of the electrode.

Although a bead mill or the like is usually used in a slurry preparation step, the structure of the polycrystalline particles in a slurry tend to be destroyed when a dispersion method using media such as beads or balls is used. When the structure of the polycrystalline particles is destroyed, the ceramic particles become similar to a filler comprising conventionally used spherical or substantially spherical primary particles.

However, in order to obtain a porous film having a high porosity, it is required that dispersion of the ceramic particles be carried out, while maintaining the above-described three-dimensional structure of the ceramic particles. Therefore, it is preferable to perform medialess dispersion in the step of obtaining a slurry by dispersing the ceramic particles and the binder in the liquid component. With medialess dispersion, collision between the ceramic particles and the media does not occur. For example, the dispersion is performed by combining jet stream and high speed shearing using a rotor. By doing so, the structure of the polycrystalline particles will hardly be destroyed, so that a porous film having a porosity of not less than 40% can be more easily obtained. For example, a high-speed rotating shearing apparatus and a high-speed rotating apparatus using a centrifugal field are known as a dispersing apparatus for performing medialess dispersion.

As the binder forming the porous film, those having heat resistance and electrolyte resistance may be used. For example, a fluorocarbon resin can be used as the binder. Polyvinylidene fluoride (PVDF), polytetrafluoroethylene (PTFE), a tetrafluoroethylene-hexafluoropropylene copolymer (FEP) and the like can be used as the fluorocarbon resin. Further, a polyacrylic acid derivative, a polyacrylonitrile derivative and the like can also be used as the binder. It is preferable that the polyacrylic acid derivative and the polyacrylonitrile derivative include at least one selected from the group consisting of a methyl acrylate unit, an ethyl acrylate unit, a methyl methacrylate unit and an ethyl methacrylate unit, in addition to an acrylic acid unit or/and an acrylonitrile unit. It is also possible to use polyethylene, styrene-butadiene rubber and the like. These may be used alone or in combination of two or more of them. Among them, a polymer including an acrylonitrile unit, i.e., a polyacrylonitrile derivative is particularly preferable. When such a material is used as the binder, the porous film is provided with even more flexibility, so that cracking or separation is difficult to occur in the porous film.

The present invention can be applied to secondary batteries in general, and can be applied to, for example, a lithium ion secondary battery and an alkaline storage battery. When an electrode plate to which the porous film is bonded is used for these secondary batteries, the large-current charge/discharge behaviors of the batteries at a low temperature, for example, the discharge characteristics at 0° C. and 2 C rate generally depend on the magnitude of the porosity of the porous film.

An electrode plate to which the porous film is bonded is effectively implemented, especially in a lithium ion secondary battery. The reason is that a lithium ion secondary battery includes an electrolyte comprising an inflammable organic non-aqueous solvent, and therefore requires a particularly high level of safety. By using an electrode plate to which the porous film is bonded, it is possible to impart high safety to a lithium ion secondary battery.

As the electrolyte of the lithium ion secondary battery, it is possible to use those obtained by dissolving lithium salt in an organic non-aqueous solvent, as described above. In general, the concentration of the lithium salt dissolved in the non-aqueous solvent is 0.5 to 2 mol/L.

While there is no particular limitation with respect to the lithium salt, it is preferable to use, for example, lithium hexafluorophosphate ($LiPF_6$), lithium perchlorate ($LiClO_4$) and lithium tetrafluoroborate ($LiBF_4$). These may be used alone or in combination of two or more of them.

While there is no particular limitation with respect to the non-aqueous solvent, for example, it is possible to use: carbonic acid esters such as ethylene carbonate (EC), propylene carbonate (PC), dimethyl carbonate (DMC), diethyl carbonate (DEC) and ethylmethyl carbonate (EMC); carboxylic acid esters such as γ-butyrolactone, γ-valerolactone, methyl formate, methyl acetate and methyl propionate; and ethers such as dimethyl ether, diethyl ether and tetrahydrofuran. One of the non-aqueous solvents may be used alone, or a combination of two or more of them may be used. Among them, it is particularly preferable to use carbonic acid esters.

In order to form a good coating on an electrode to ensure the safety and the like at the time of overcharging, it is preferable to add, for example, vinylene carbonate (VC), cyclohexylbenzene (CHB), or denatured VC or CHB to the non-aqueous electrolyte.

In addition, the negative electrode of the lithium ion secondary battery is formed by disposing, on a negative electrode current collector, a material mixture layer that includes a negative electrode active material comprising at least a material capable of adsorbing and desorbing lithium ion, a negative electrode binder and a thickener.

As the negative electrode active material, it is possible to use carbon materials such as various natural graphites, various artificial graphites, petroleum cokes, carbon fibers and fired materials of organic polymers, as well as oxides, silicon- or tin-containing composite materials such as silicides, and various metallic or alloy materials.

While there is no particular limitation with respect to the negative electrode binder, rubber particles are preferable from the viewpoint of the capability of exhibiting binding property in a small amount, and those including styrene units and butadiene units are particularly preferable. For example, it is possible to use a styrene-butadiene copolymer (SBR) and a modified product of SBR.

In the case of using rubber particles as the negative electrode binder, it is preferable to use a thickener comprising a water-soluble polymer together. As the water-soluble polymer, cellulose-based resins are preferable, and CMC is particularly preferable. As the negative electrode binder, it is also possible to use PVDF, a modified product of PVDF and the like.

The amount of each of the negative electrode binder comprising rubber particles and the thickener comprising a water-soluble polymer that are included in the negative electrode is preferably 0.1 to 5 parts by weight per 100 parts by weight of the negative electrode active material, respectively.

As the negative electrode current collector, it is possible to use, for example, a metal foil that is stable at the negative electrode potential, such as a copper foil, and a film in which metal such as copper is disposed on its surface layer. The negative electrode current collector may be provided with irregularities on its surface, or may be perforated.

Further, the positive electrode of the lithium ion secondary battery is formed by disposing, on a positive electrode current collector, a material mixture layer that includes a positive electrode active material comprising at least a lithium composite oxide, a positive electrode binder and a conductive agent.

As the lithium composite oxide, it is preferable to use, for example, lithium cobaltate ($LiCoO_2$), a modified product of lithium cobaltate, lithium nickelate ($LiNiO_2$), a modified product of lithium nickelate, lithium manganate ($LiMn_2O_2$), a modified product of lithium manganate, a material obtained by partly replacing Co, Ni or Mn of these oxides with another transition metal element or a typical metal such as aluminum or magnesium, or a compound widely called as olivinic acid that contains iron as the main constituent element.

There is no particular limitation with respect to the positive electrode binder, and it is possible to use, for example, polytetrafluoroethylene (PTFE), a modified product of PTFE, PVDF, a modified product of PVDF, and modified acrylonitrile rubber particles (e.g., "BM-500B (product name)" manufactured by ZEON Corporation). PTFE or BM-500B is preferably used together with CMC, polyethylene oxide (PEO), or a modified acrylonitrile rubber (e.g., "BM-720H (product name)" manufactured by ZEON Corporation) as the thickener.

As the conductive agent, it is possible to use, for example, acetylene black, ketjen black and various graphites. These may be used alone or in combination of two or more of them.

As the positive electrode current collector, it is possible to use, for example, a metal foil that is stable at the positive electrode potential, such as an aluminum foil, and a film in which metal such as aluminum is disposed on its surface layer. The positive electrode current collector may be provided with irregularities on its surface, or may be perforated.

The present invention can also be applied to a secondary battery that does not use a conventionally used sheet-like (cloth-like) separator (hereinafter, simply referred to as "separator"). In that case, it is not necessary to use a conventionally used sheet-like separator, so that a low-cost battery can be realized. However, when a sheet-like separator is not used, it is necessary to exercise a high degree of caution against intrusion of foreign matter during the production process of the battery, thus fully avoiding a short circuit failure.

The present invention can also be applied to a secondary battery that uses a sheet-like separator, as a matter of course. By interposing a sheet-like separator between the positive electrode and the negative electrode, the capability of preventing short circuit of the battery is further improved, which further improves the safety and the reliability of the battery.

Although there is no particular limitation with respect to the sheet-like separator, as long as it is made of a material that can endure an environment in which the lithium ion secondary battery is used, it is common to use a microporous sheet made of a polyolefin resin. As the polyolefin resin, it is possible to use, for example, polyethylene and polypropylene. The microporous sheet may be a single layer film made of a single polyolefin resin, or may be a multilayer film made of two or more polyolefin resins. There is no particular limitation with respect to the thickness of the sheet-like separator, but it is preferably 8 to 30 μm from the viewpoint of maintaining the design capacity of the battery.

Hereinafter, the present invention will be specifically described by way of examples; however, the contents described here are only illustrative examples of the present invention, and the present invention is not limited to these.

EXAMPLE 1

(I) Preparation of Ceramic Particles including Polycrystalline Particles

Here, ceramic particles including α-alumina were prepared.

First, aluminum tributoxide, which is aluminum alkoxide, was provided. Pure water was added to aluminum tributoxide, and the whole was subjected to hydrolysis to form an alumina gel, which was then dried. The thus obtained dry gel was used as the ceramic precursor.

Subsequently, the dry gel serving as the ceramic precursor was fired at 1200° C. for three hours, thus obtaining a fired material comprising α-alumina. As a result of determining the average particle size of the single crystal cores of α-alumina from SEM pictures for the obtained fired material, it was about 0.2 μm.

The obtained fired material was crushed with a jet mill. Here, the particles having the respective bulk densities and BET specific surface areas shown in Table 1 were obtained by controlling the crushing conditions such that the bulk density of the ceramic particles was 0.05 to 1.1 g/cm$^3$ and the BET specific surface area was 3 to 22 m$^2$/g. In addition, the bulk density was measured by a static method using a "powder tester (product name)" manufactured by Hosokawa Micron Corporation. Observation of the obtained particles with SEM pictures confirmed that all of them were dendritic polycrystalline particles.

TABLE 1

| Slurry | Filler | Dispersion method | Bulk density (g/cm³) | BET specific surface area (m²/g) | Porosity of porous film (%) | Reached temperature in nail penetration test (° C.) | Discharge capacity at 0° C., 2 C rate (mAh) |
|---|---|---|---|---|---|---|---|
| A1 | Alumina dendritic particles derived from aluminum alkoxide | Medialess | 0.05 | 22 | 76 | 95 | 1840 |
| A2 | Alumina dendritic particles derived from aluminum alkoxide | Medialess | 0.1 | 17 | 71 | 92 | 1840 |
| A3 | Alumina dendritic particles derived from aluminum alkoxide | Medialess | 0.4 | 9 | 65 | 94 | 1830 |
| A4 | Alumina dendritic particles derived from aluminum alkoxide | Medialess | 0.8 | 5 | 49 | 91 | 1780 |
| A5 | Alumina dendritic particles derived from aluminum alkoxide | Medialess | 1.1 | 3 | 42 | 93 | 1590 |

(II) Preparation of Slurry Including Source Material of Porous Film

To 100 parts by weight of predetermined polycrystalline alumina particles, 4 parts by weight of a binder ("BM-720H (product name)" manufactured by ZEON Corporation) comprising a polyacrylic acid derivative and a proper amount of N-methyl-2-pyrrolidone (hereinafter, referred to as "NMP") serving as a dispersing medium were mixed, preparing a slurry with a non-volatile content of 60 wt %.

Here, the mixture of the polycrystalline alumina particles, the binder and the dispersing medium was stirred with a medialess disperser "CLEAR MIX (product name)" manufactured by M Technique Co., LTD. to disperse the polycrystalline alumina particles and the binder in NMP until they became homogeneous, thereby obtaining slurries A1 to A5.

(III) Measurement of Porosity of Porous Film

Each of the slurries A1 to A5 was applied onto a metal foil with a doctor blade, followed by drying the coated film at 120° C. for one hour, obtaining an about 20 μm thick test pieces of the porous films.

Subsequently, the true volume V1, which included no voids, and the apparent volume V1, which included voids, were measured for each of the test pieces of the porous films, and the porosity P was determined using the following expression:

$$P(\%) = \{(V2 - V1)/V2\} \times 100$$

The results are shown in Table 1.

(IV) Observation of Porous Films

Figure 2:
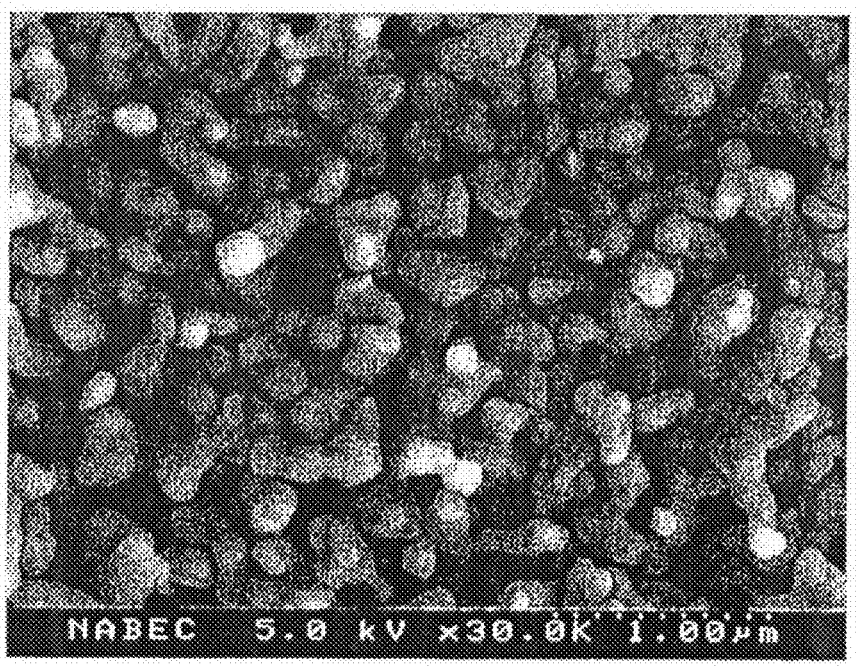
FIG. 2 is a SEM picture of the surface of a porous film according to one example of the present invention.

The surface of the test piece produced from the slurry A3 was observed with a scanning electron microscope (SEM). FIG. 2 shows a magnified picture (SEM picture) at a magnification of 30000. From FIG. 2, it can be seen that the polycrystalline alumina particles showed a dendritic shape. Furthermore, since relatively large voids were formed between the particles, it can be seen that the porosity of the porous film was high.

(V) Fabrication of Lithium Ion Secondary Batteries

Test batteries including a porous film bonded onto the negative electrode were fabricated using the slurries A1 to A5, and their charge/discharge characteristics were evaluated to confirm the effectiveness of the present invention.

In the following, the production process of the batteries will be described.

<a>Production of Positive Electrode 3 kg of lithium cobaltate as the positive electrode active material, 1 kg of "#1320 (product name)" (an NMP solution containing 12 wt % of PVDF) manufactured by KUREHA CORPORATION as the positive electrode binder, 90 g of acetylene black as the conductive agent, and a proper amount of NMP were stirred with a double arm kneader, preparing a positive electrode material mixture paint. This paint was applied onto both surfaces of a 15 μm thick aluminum foil serving as the positive electrode current collector, except for a positive electrode lead connecting portion, and the coated film was rolled with rollers after being dried, forming a positive electrode material mixture layer with an active material layer density (weight of active material/volume of material mixture layer) of 3.3 g/cm³. At this time, the thickness of the electrode plate comprising the aluminum foil and the positive electrode material mixture layers was controlled to 160 μm. Thereafter, the electrode plate was slit into a width that could be inserted into a battery can of a cylindrical battery (part number: 18650), thereby obtaining a positive electrode hoop.

<b>Production of Negative Electrode 3 kg of artificial graphite as the negative electrode active material, 75 g of "BM-400B (product name)" (an aqueous dispersion containing 40 wt % of a modified product of a styrene-butadiene copolymer) manufactured by ZEON Corporation as the negative electrode binder, 30 g of CMC as the thickener and a proper amount of water were stirred with a double arm kneader, preparing a negative electrode material mixture paint. This paint was applied onto both surfaces of a 10 μm thick copper foil serving as the negative electrode current collector, except for a negative electrode lead connecting portion, and the coated film was rolled with a roller after being dried, forming a negative electrode material mixture layer with an active material layer density (weight of active material/volume of material mixture layer) of 1.4 g/cm³. At this time, the thickness of the electrode plate comprising the copper foil and the negative electrode material mixture layers was controlled to 180 μm. Thereafter, the electrode plate was slit into a width that could be inserted into a battery can of a cylindrical battery (part number: 18650), thereby obtaining a negative electrode hoop.

<c>Formation of Porous Film

A predetermined slurry was applied onto both surfaces of the negative electrode hoop at a speed of 0.5 m/min by gravure rolling, and this was dried by blowing hot air at 120° C. with an air speed of 0.5 m/sec, thereby forming a porous film bonded to the surface of the negative electrode and having a thickness of 5 μm per surface.

<d>Preparation of Non-Aqueous Electrolyte $LiPF_6$ was dissolved at a concentration of 1 mol/L in a non-aqueous solvent mixture containing EC, DMC and EMC at a volume ratio of 2:3:3, thereby preparing a non-aqueous electrolyte. Further, 3 parts by weight of VC were added per 100 parts by weight of the non-aqueous electrolyte.

<e>Fabrication of Battery

Using the above-described positive electrode, negative electrode and non-aqueous electrolyte, a 18650 cylindrical battery was fabricated by the following procedure. First, each of the positive electrode and the negative electrode was cut into a predetermined length. One end of the positive electrode lead and that of the negative electrode lead were connected to the positive electrode lead connecting portion and the negative electrode lead connecting portion, respectively. Thereafter, the positive electrode and the negative electrode were wound up, with a separator comprising a 15 μm thick microporous sheet made of polyethylene resin interposed therebetween, thus forming a columnar electrode plate group. The outer surface of the electrode plate group was covered with the separator. This electrode plate group was housed in a battery can, while being sandwiched between an upper insulating ring and a lower insulating ring. Subsequently, 5 g of the above-described non-aqueous electrolyte was weighed, then injected into the battery can, and permeated into the electrode plate group by reducing the pressure to 133 Pa.

The other end of the positive electrode lead and that of the negative electrode lead were welded to the back surface of a battery cover plate and the inner bottom surface of the battery can, respectively. Finally, the opening of the battery can was covered with the battery cover plate, which included an insulating packing disposed at its periphery. Thereby, a cylindrical lithium ion secondary battery having a theoretical capacity of 2 Ah was completed.

(VI) Evaluation of Low-Temperature Discharge Characteristics

Each battery was subjected to preliminary charging/discharging twice, and stored in a charged state under an environment of 45° C. for 7 days. Thereafter, charging/discharging was performed under an environment of 20° C. as follows:

(1) Constant current discharge: 400 mA (end voltage 3 V)
(2) Constant current charge: 1400 mA (end voltage 4.2 V)
(3) Constant voltage charge: 4.2 V (end current 100 mA)
(4) Constant current discharge: 400 mA (end voltage 3 V)
(5) Constant current charge: 1400 mA (end voltage 4.2 V)
(6) Constant voltage charge: 4.2 V (end current 100 mA)

Then, after each battery was stood still for three hours, discharging was performed under an environment of 0° C. as follows.

(7) Constant current discharge: 4000 mA (end voltage 3V).

Table 1 shows the discharge capacities obtained during discharging at 0° C. and 2 C rate at this time.

(VII) Nail Penetration Test

Each battery was subjected to charging as follows.
Constant current charge: 1400 mA (end voltage 4.25 V)
Constant voltage charge: 4.25 V (end current 100 m A)

An iron wire nail having a diameter of 2.7 mm was penetrated into each of the charged batteries from its side at a speed of 5 mm/sec under an environment of 20° C., and the heat generation state at that time was observed. The temperature that was reached after 90 seconds at the penetrated portion of each battery was measured. The results are shown in Table 1.

EXAMPLE 2

Here, ceramic particles including α-alumina were also prepared.

First, ammonium dawsonite, which is aluminum ammonium salt, was provided as the alumina precursor. This was fired at 1200° C. for three hours, thus obtaining a fired material comprising α-alumina. As a result of determining the average particle size of the single crystal cores of α-alumina from SEM pictures for the obtained fired material, it was about 0.1 μm.

The obtained fired material was crushed with a jet mill. Here, the particles having the respective bulk densities and BET specific surface areas shown in Table 2 were obtained by controlling the crushing conditions such that the bulk density of the ceramic particles was 0.05 to 1.2 g/cm³ and the BET specific surface area was 3.5 to 25 m²/g. The bulk density was also measured here by a static method using a "powder tester (product name)" manufactured by Hosokawa Micron Corporation. Observation of the obtained particles with SEM pictures confirmed that all of them were dendritic polycrystalline particles.

TABLE 2

| Slurry | Filler | Dispersion method | Bulk density (g/cm³) | BET specific surface area (m²/g) | Porosity of porous film (%) | Reached temperature in nail penetration test (° C.) | Discharge capacity at 0° C., 2 C rate (mAh) |
|---|---|---|---|---|---|---|---|
| B1 | Alumina dendritic particles derived from ammonium dawsonite | Medialess | 0.05 | 25 | 78 | 93 | 1840 |
| B2 | Alumina dendritic particles derived from ammonium dawsonite | Medialess | 0.1 | 20 | 72 | 90 | 1840 |
| B3 | Alumina dendritic particles derived | Medialess | 0.4 | 12 | 63 | 95 | 1820 |

TABLE 2-continued

| Slurry | Filler | Dispersion method | Bulk density (g/cm³) | BET specific surface area (m²/g) | Porosity of porous film (%) | Reached temperature in nail penetration test (° C.) | Discharge capacity at 0° C., 2 C rate (mAh) |
|---|---|---|---|---|---|---|---|
| | from ammonium dawsonite | | | | | | |
| B4 | Alumina dendritic particles derived from ammonium dawsonite | Medialess | 0.8 | 6 | 48 | 93 | 1770 |
| B5 | Alumina dendritic particles derived from ammonium dawsonite | Medialess | 1.2 | 3.5 | 42 | 94 | 1580 |

Slurries B1 to B5 were obtained in the same manner as in Example 1, except for using the thus obtained polycrystalline alumina particles. In addition, the porosity of the porous films that had been obtained using the slurries B1 to B5 was measured in the same manner as in Example 1. Further, lithium ion secondary batteries (test batteries) were fabricated in the same manner as in Example 1, and the evaluation of the low-temperature discharge characteristics and the nail penetration test were carried out for these. The results are shown in Table 2.

COMPARATIVE EXAMPLE 1

Here, a slurry C1 was obtained in the same manner as in Example 1, except for using alumina particles comprising spherical or substantially spherical primary particles having an average particle size of 0.3 µm in place of the dendritic polycrystalline particles. In addition, the porosity of the porous film that had been produced using the slurry C1 was measured in the same manner as in Example 1. Further, a lithium ion secondary battery (test battery) was fabricated in the same manner as in Example 1, and the evaluation of the low-temperature discharge characteristics and the nail penetration test were carried out for this. The results are shown in Table 3.

alumina particles were densely filled, with no large void formed between the particles, it can be seen that the porosity of the porous film was low.

COMPARATIVE EXAMPLE 2

Here, a slurry C2 was obtained using the same source material and composition as those of the slurry A3 of Example 1, using a bead mill disperser in place of the medialess disperser. In addition, the porosity of the porous film that had been produced using the slurry C2 was measured in the same manner as in Example 1. Further, a lithium ion secondary battery (test battery) was fabricated in the same manner as in Example 1, and the evaluation of the low-temperature discharge characteristics and the nail penetration test were carried out for this. The results are shown in Table 3.

COMPARATIVE EXAMPLE 3

Here, a slurry C3 was obtained using the same source material and composition as those of the slurry B3 of Example 1, using a bead mill disperser in place of the medialess disperser. In addition, the porosity of the porous film that had been produced using the slurry C3 was measured in the

TABLE 3

| Slurry | Filler | Dispersion method | Bulk density (g/cm³) | BET specific surface area (m²/g) | Porosity of porous film (%) | Reached temperature in nail penetration test (° C.) | Discharge capacity at 0° C., 2 C rate (mAh) |
|---|---|---|---|---|---|---|---|
| C1 | Alumina spherical particles | Medialess | 1.1 | 3 | 39 | 92 | 1480 |
| C2 | Alumina dendritic particles derived from aluminum alkoxide | Bead mill dispersion | 0.4 | 9 | 43 | 95 | 1590 |
| C3 | Alumina dendritic particles derived from ammonium dawsonite | Bead mill dispersion | 0.4 | 12 | 44 | 93 | 1600 |

Figure 4:
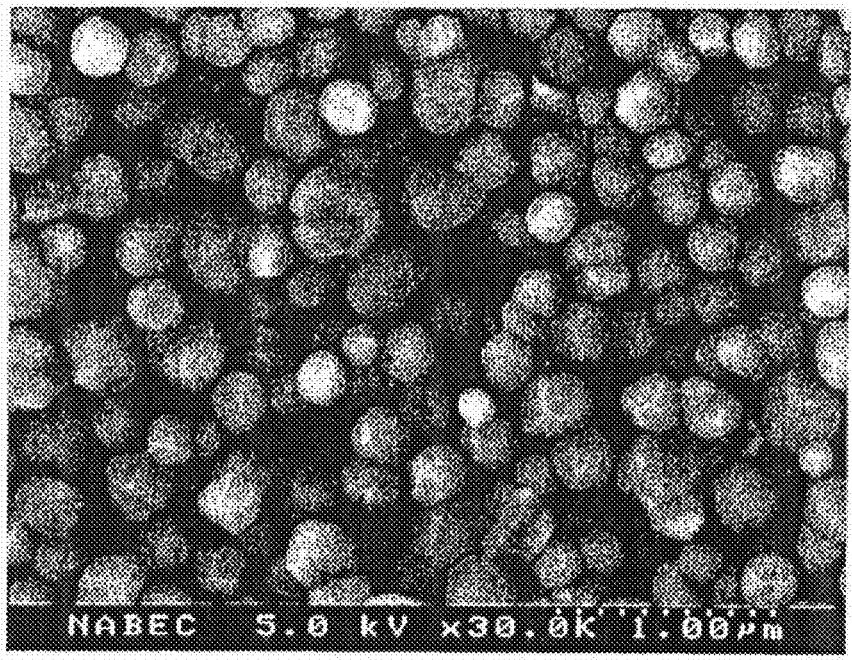
FIG. 4 is a SEM picture of the surface of a conventionally used porous film according to a comparative example.

The surface of the test piece of the porous film that had been produced from the slurry C1 was observed with a scanning electron microscope (SEM) in the same manner as in Example 1. FIG. 4 shows a magnified picture (SEM picture) at a magnification of 30000. In FIG. 4, since the spherical same manner as in Example 1. Further, a lithium ion secondary battery (test battery) was fabricated in the same manner as in Example 1, and the evaluation of the low-temperature discharge characteristics and the nail penetration test were carried out for this. The results are shown in Table 3.

Consideration

From Tables 1 to 3, it was possible to confirm that the porosity of the porous film exceeded 45% when the slurries prepared by using the dendritic polycrystalline particles and performing medialess dispersion were used. Further, a porosity of 45% or higher was achieved when the bulk density of the ceramic particles was not more than 0.8 g/Cm$^3$, and the BET specific surface area thereof was not less than 5 m$^2$/g. That is, when the bulk density of ceramic particles was greater than 0.8 g/cm$^3$ and the BET specific surface area was smaller than 5 m$^2$/g (the slurries A5 and B5), the porosity of the porous film was higher than 40%, but lower than 45%, and the low-temperature discharge characteristics were also inferior. Furthermore, when the alumina particles comprising spherical or substantially spherical primary particles (the slurry C1) were used, the porosity of the porous film was lower than 40%, and the low-temperature discharge characteristics were also inferior.

In each of the cases where the porosity exceeded 45%, it was possible to achieve a high discharge capacity during the low-temperature discharge. However, the slurries A1 and B1 had a high viscosity in a low-shear state, exhibiting properties somewhat closer to a gel. Therefore, there were cases where the load on the dispersing apparatus excessively increased in the slurry dispersion step, thus making it difficult to perform the dispersion appropriately, or clogging the piping of the dispersing apparatus with the slurry. Further, as a result of performing gravure coating of the slurries A1 and B1, it was shown that the coated film tended to have nonuniform thickness.

From the foregoing, it can be said that it is preferable that the bulk density of the ceramic particles is 0.1 to 0.8 g/cm$^3$, and the BET specific surface area is 5 to 20 m$^2$/g, in terms of the battery performance and the production process.

From Table 3, it was possible to confirm that, when a bead mill or the like was used in the slurry dispersion step, the porosity of the porous film was reduced and the low-temperature discharge characteristics were also inferior, even if the dendritic polycrystalline particles were used. In addition, observation of the fillers of the slurries C2 and C3 with a SEM confirmed that the ceramic particles were destroyed nearly into primary particles, and almost no polycrystalline particle was present.

It seems that beads and the ceramic particles repeatedly collide with each other in a disperser such as a bead mill, and the polycrystalline particles therefore disintegrated into a state close to single crystal cores. In contrast, it seems that, when the slurry was prepared by medialess dispersion, the polycrystalline particles were not destroyed and were able to maintain their dendritic shape.

Next, the results of the nail penetration test that are shown in Tables 1 to 3 indicate that the same or better level of safety against nail penetration could be achieved even when the dendritic ceramic particles with a small bulk density were used as the filler of the porous film, and the ceramic particles were not filled in the porous film at high density.

EXAMPLE 3

A lithium ion secondary battery was fabricated without using a sheet-like separator.

Here, the separator comprising a 15 μm thick microporous sheet made of a polyethylene resin was not used, and instead a porous film was formed in a large thickness on the negative electrode using the slurry A3 of Example 1. The thickness of the porous film after drying was 20 μm.

The obtained test battery exhibited a discharge capacity of 1830 mAh during discharging at a low temperature and 2 C rate, as with the battery fabricated using the slurry A3 in Example 1. Although a conventionally used sheet-like separator is expensive, it did not need to be used in the present example, so that the battery could be produced at low cost.

EXAMPLE 4

Slurries D1 to D1 were obtained in the same manner as in Example 1, except for using, as the ceramic particles, a mixture of the same polycrystalline particles as used for the slurry A4 of Example 1 and other particles. As other particles, those having the bulk density and BET specific surface area shown in Table 4 were used. The mixing ratios of other particles in the entire ceramic particles were as shown in Table 4.

TABLE 4

| Slurry | Other particles | Mixing ratio of other particles (wt %) | Dispersion method | Bulk density (g/cm$^3$) | BET specific surface area (m$^2$/g) | Porosity of porous film (%) | Reached temperature in nail penetration test (° C.) | Discharge capacity at 0° C., 2 C rate (mAh) |
|---|---|---|---|---|---|---|---|---|
| D1 | Particles V | 15 | Medialess | 0.4 | 5 | 46 | 94 | 1690 |
| D2 |  | 30 |  |  |  | 43 | 92 | 1610 |
| D3 | Particles W | 15 | Medialess | 0.6 | 7.1 | 44 | 89 | 1650 |
| D4 |  | 30 |  |  |  | 40 | 87 | 1600 |
| D5 | Particles X | 15 | Medialess | 0.5 | 14 | 49 | 95 | 1760 |
| D6 |  | 30 |  |  |  | 46 | 94 | 1700 |
| D7 | Particles Y | 15 | Medialess | 0.3 | 13 | 48 | 94 | 1760 |
| D8 |  | 30 |  |  |  | 45 | 93 | 1680 |
| D9 | Particles Z | 15 | Medialess | 0.3 | 6 | 47 | 90 | 1740 |
| D10 |  | 30 |  |  |  | 45 | 91 | 1680 |

Particles V: alumina spherical particles

Particles W: alumina massive particles

Particles X: magnesia (magnesium oxide)

Particles Y: zirconia (zirconium oxide)

Particles Z: silica (silicon dioxide)

Herein, the particles V were single crystal particles, and synthesized by a CVD process in which aluminum alkoxide was caused to react in a vapor phase. The particles W were square cornered block particles, and obtained by a Bayer process in which bauxite was dissolved with sodium hydroxide to precipitate aluminum hydroxide, and the precipitated aluminum hydroxide was fired after dehydration.

Then, the porosities of the porous films that had been produced using the slurries D1 to D10 were measured in the same manner as in Example 1. Further, lithium ion secondary batteries (test batteries) were fabricated using the slurries D1 to D10 in the same manner as in Example 1, and the evaluation of the low-temperature discharge characteristics and the nail penetration test were carried out for these. The results are shown in Table 4.

The present invention can be applied to a secondary battery, in particular a portable power source and the like in which a porous film for improving the safety of the battery is provided on its electrode plate, from the viewpoint of improving the large-current discharge characteristics, especially at a low temperature. While the present invention can be applied to secondary batteries in general, it is particularly effective for a lithium ion secondary battery, which includes an electrolyte comprising an inflammable organic non-aqueous solvent and requires a high level of safety.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A secondary battery comprising: a positive electrode; a negative electrode; and a porous film that is bonded to a surface of at least one electrode selected from said positive electrode and said negative electrode,
    wherein said porous film includes ceramic particles and a binder,
    said ceramic particles include polycrystalline particles including single crystal cores obtained by mechanically crushing a fired material comprising a ceramic,
    a neck is formed between at least a pair of said single crystal cores, said neck comprising the same material as said single crystal cores, and
    said polycrystalline particles have a dendritic or coralloid shape.

2. The secondary battery in accordance with claim 1, wherein said polycrystalline particles comprise alumina.

3. The secondary battery in accordance with claim 1, wherein said ceramic particles have a bulk density of 0.1 to 0.8 $g/cm^3$.

4. The secondary battery in accordance with claim 1, wherein said ceramic particles have a BET specific surface area of 3 to 20 $m^2/g$.

5. The secondary battery in accordance with claim 1, wherein not less than 70 wt % of said ceramic particles is constituted by said polycrystalline particles, and less than 30 wt % thereof is constituted by other particles.

6. The secondary battery in accordance with claim 5, wherein at least a portion of said other particles comprises at least one selected from the group consisting of alumina, magnesia, silica and zirconia.

7. The secondary battery in accordance with claim 1, wherein said porous film has a porosity of 40 to 80%.

8. The secondary battery in accordance with claim 1, further comprising a separator interposed between said positive electrode and said negative electrode.

9. The secondary battery in accordance with claim 1, wherein said single crystal cores have an average particle size of 0.05 µm to 1 µm.

10. The secondary battery in accordance with claim 1, wherein said polycrystalline particles include not less than 3 and not more than 30 single crystal cores, on average.

11. A secondary battery comprising: a positive electrode; a negative electrode; and a porous film that is bonded to a surface of at least one electrode selected from said positive electrode and said negative electrode,
    wherein said porous film includes ceramic particles and a binder,
    said ceramic particles include polycrystalline particles including single crystal cores obtained by mechanically crushing a fired material comprising a ceramic,
    a neck is formed between at least a pair of said single crystal cores, said neck comprising the same material as said single crystal cores, and
    said polycrystalline particles have a dendritic or coralloid shape, and said polycrystalline particles having a dendritic or coralloid shape are bound by the binder to form a three-dimensional structure having a three-dimensional void structure therein.

12. A secondary battery comprising: a positive electrode; a negative electrode; and a porous film that is bonded to a surface of at least one electrode selected from said positive electrode and said negative electrode,
    wherein said porous film includes ceramic particles and a resin binder, said binder being present in said porous film in a lower amount by weight than said ceramic particles,
    said ceramic particles include polycrystalline particles including single crystal cores obtained by mechanically crushing a fired material comprising a ceramic,
    a neck is formed between at least a pair of said single cores, said neck comprising the same material as said single crystal cores, and
    said polycrystalline particles have a dendritic or coralloid shape.

* * * * *